US011281858B1

(12) United States Patent
Mazor et al.

(10) Patent No.: US 11,281,858 B1
(45) Date of Patent: Mar. 22, 2022

(54) SYSTEMS AND METHODS FOR DATA CLASSIFICATION

(71) Applicant: Exceed AI Ltd, Tel-Aviv (IL)

(72) Inventors: Igal Mazor, Tel-Aviv (IL); Yaron Ismah-Moshe, Tel-Aviv (IL)

( * ) Notice: Subject to any disclaimer, the term of this patent is extended or adjusted under 35 U.S.C. 154(b) by 0 days.

(21) Appl. No.: 17/373,810

(22) Filed: Jul. 13, 2021

(51) Int. Cl.
*G06F 40/30* (2020.01)
*G06F 40/284* (2020.01)
*G06N 20/00* (2019.01)
*G06F 16/33* (2019.01)
*G06F 40/166* (2020.01)

(52) U.S. Cl.
CPC ........ *G06F 40/284* (2020.01); *G06F 16/3344* (2019.01); *G06F 40/166* (2020.01); *G06N 20/00* (2019.01)

(58) Field of Classification Search
CPC .... G06F 40/211; G06F 40/253; G06F 40/268; G06F 40/284; G06F 40/30
See application file for complete search history.

(56) References Cited

U.S. PATENT DOCUMENTS

| | | | | |
|---|---|---|---|---|
| 6,137,911 A * | 10/2000 | Zhilyaev | | G06F 16/353 382/225 |
| 6,192,360 B1 * | 2/2001 | Dumais | | G06K 9/6269 |
| 9,761,220 B2 * | 9/2017 | Levit | | G10L 15/063 |
| 10,198,431 B2 * | 2/2019 | Somasundaran | | G06F 40/284 |
| 10,339,470 B1 * | 7/2019 | Dutta | | G06N 20/20 |
| 10,467,339 B1 * | 11/2019 | Shen | | G06F 40/242 |
| 2003/0037073 A1 * | 2/2003 | Tokuda | | G06F 16/355 715/234 |
| 2005/0071152 A1 * | 3/2005 | Morimoto | | G06F 40/279 704/10 |
| 2010/0094875 A1 * | 4/2010 | Harrison | | G06F 16/355 707/741 |
| 2010/0228733 A1 * | 9/2010 | Harrison | | G06F 16/31 707/739 |
| 2012/0078834 A1 * | 3/2012 | Sainath | | G06F 40/216 706/50 |
| 2012/0117082 A1 * | 5/2012 | Koperda | | G06F 16/24578 707/748 |
| 2012/0221496 A1 * | 8/2012 | Goyal | | G06F 16/35 706/12 |
| 2012/0288207 A1 * | 11/2012 | Sun | | G06F 16/353 382/224 |
| 2014/0052728 A1 * | 2/2014 | Nakazawa | | G06F 16/355 707/737 |
| 2016/0078022 A1 * | 3/2016 | Lisuk | | G06F 40/117 706/12 |
| 2016/0189057 A1 * | 6/2016 | Rao | | G06F 16/285 706/12 |
| 2016/0224662 A1 * | 8/2016 | King | | G06F 16/332 |
| 2016/0260184 A1 * | 9/2016 | Morimoto | | G06F 16/93 |
| 2016/0292803 A1 * | 10/2016 | Morimoto | | G06F 16/285 |

(Continued)

*Primary Examiner* — Lamont M Spooner

(57) ABSTRACT

A computer implemented method of document classification includes receiving a text document. A first classification is generated for the document, and a text corpus is searched for one or more terms from the document. Searched terms having an incidence in the text corpus lower than a threshold incidence are flagged, and at least one classification is generated after removing at least one flagged term from the document. An output is generated if the further classification is different from the first classification.

15 Claims, 3 Drawing Sheets

(56) References Cited

U.S. PATENT DOCUMENTS

| | | | |
|---|---|---|---|
| 2016/0321582 A1* | 11/2016 | Broudou | G06N 20/00 |
| 2016/0336006 A1* | 11/2016 | Levit | G10L 15/10 |
| 2017/0011480 A1* | 1/2017 | Morimoto | G06Q 10/107 |
| 2017/0011481 A1* | 1/2017 | Morimoto | G06Q 30/0185 |
| 2017/0017721 A1* | 1/2017 | Sauper | G06F 16/248 |
| 2017/0053213 A1* | 2/2017 | Zhou | G06Q 30/0248 |
| 2017/0124067 A1* | 5/2017 | Okamoto | G06F 40/211 |
| 2017/0293607 A1* | 10/2017 | Kolotienko | G06F 40/226 |
| 2017/0293842 A1* | 10/2017 | Buchanan | G06F 16/353 |
| 2019/0147103 A1* | 5/2019 | Bhowan | G06N 5/022 707/737 |
| 2019/0197119 A1* | 6/2019 | Zhang | G06F 40/58 |
| 2019/0370604 A1* | 12/2019 | Galitsky | G06N 5/003 |
| 2021/0056169 A1* | 2/2021 | Bahirwani | G06F 40/35 |
| 2021/0073673 A1* | 3/2021 | Janakiraman | G06F 40/284 |
| 2021/0081566 A1* | 3/2021 | Broudou | G06Q 50/18 |
| 2021/0192203 A1* | 6/2021 | Ren | G06K 9/00483 |

\* cited by examiner

SYSTEMS AND METHODS FOR DATA CLASSIFICATION

FIELD OF THE INVENTION

This invention relates in general to the field of data classification using deep learning models and, in particular, to the classification of text documents.

BACKGROUND OF THE INVENTION

Deep learning models can be used to classify various forms of data. It is known to train these deep learning models based on a corpus of training data which includes a large number of data observations with pre-assigned classifications. Using machine learning techniques, a deep learning model to assign a previously unseen data observation to one of the plurality of classifications seen in the training data.

One example of a classification model is a text classification model, where input text documents are assigned to one of a plurality of classifications. For example, an email management tool may use a text classification model to automatically assign incoming mail to one of a plurality of known classes. The email management tool may automatically take action, e.g. generate responses or follow-up tasks, based on the assigned class.

FIG. 1 is a schematic diagram showing a conventional document classifier 100, e.g. an email management tool which uses a text classification model. The document classifier 100 is configured to receive an input text 10 in the form of a text document, e.g. an email. The document classifier 100 then assigns the input text 10 to one of a plurality, N, document classes 20. For example, where the input text 10 comprises an email replies to an outgoing email communication, such as a marketing email, the replies may be classified into one or more classes such as 'not interested', 'interested', 'existing customer', 'wrong person', 'unsubscribe', 'left company', 'contact later', etc.

Where feedback is available, for example through supervision, sampling or client feedback, then an update mechanism may improve the text classification model by positive reinforcement of a correct result and negative reinforcement of an incorrect result. Through feedback, accurately classified documents may be added to a text corpus for the model, which may be stored in a memory 30.

In an initial training phase, the document classifier 100 receives training data in the form of a plurality of email documents. The email documents in the training data may be referred to as observations. Each email document in the training data is provided with a pre-assigned classification, for example, each email may be classified according to an intent or purpose of the author. Following a conventional machine learning technique, parameters of the text classification model are randomised in an initial state and the email documents are assigned to the plurality of classes 20. The update mechanism is used to improve the parameters of the text classification model by comparing the assignments to the known classification of each email document. This process is repeated until the document classifier 100 can reliably assign the email documents of the training data to the correct classes 20. The text content of the training data may be referred to as the text corpus of the classification model, and may be stored in the memory 30.

At this stage it is intended that the text classification model can also accurately assign previously unseen email documents. However, certain documents may be mis-classified by the model. In particular, documents within terminology not previously seen by the model, i.e. not within the text corpus, may cause the model to behave unpredictably or erroneously, leading to a mis-classification of the document.

As such, there is a need to improve the accuracy of a trained text classification model. The present invention aims to address this need.

SUMMARY OF THE INVENTION

According to a first aspect of the present invention, there is provided a method of document classification according to claim 1.

According to a second aspect of the present invention, there is provided a data processing apparatus according to claim 12.

According to a third aspect of the present invention, there is provided a computer-readable medium according to claim 13.

Optional features are as set out in the dependent claims.

BRIEF DESCRIPTION OF THE DRAWINGS

For a better understanding of the present invention and to show more clearly how it may be carried into effect, reference will now be made by way of example only, to the accompanying drawings, in which.

DETAILED DESCRIPTION OF THE INVENTION

The present invention relates to a processing apparatus and a method for document classification. In particular, a processing method is applied to a classify an input text document, and an accuracy check is performed on the classification result.

The classification model may be a document classification model and may be configured to assign a plurality of text documents to a plurality of document classes. For example, a document classification model may receive a plurality of incoming emails and assign each incoming email to a class according to an intent of the author.

Figure 1:
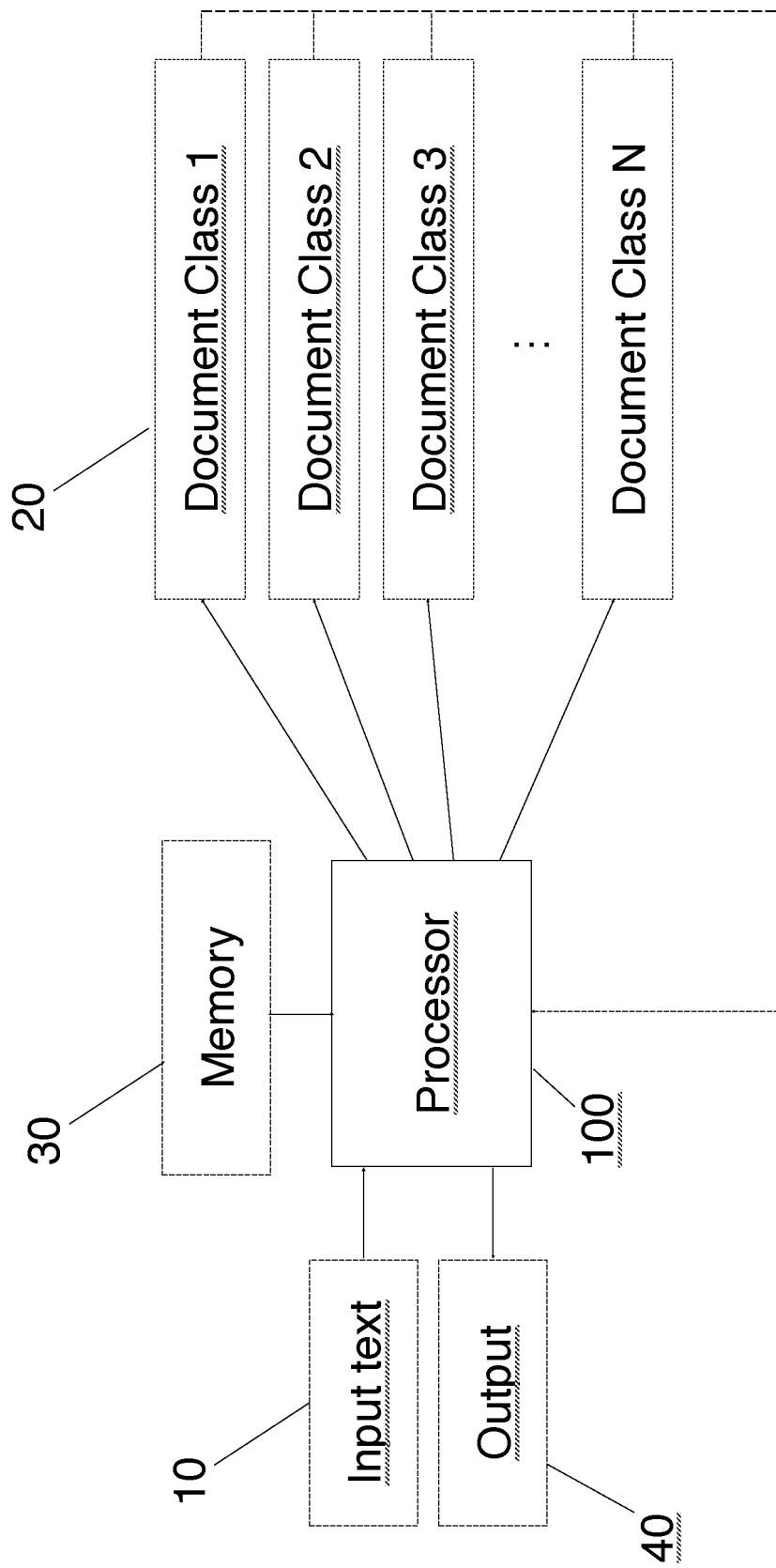
FIG. 1 is schematic diagram showing a conventional document classifier system.
Figure 2:
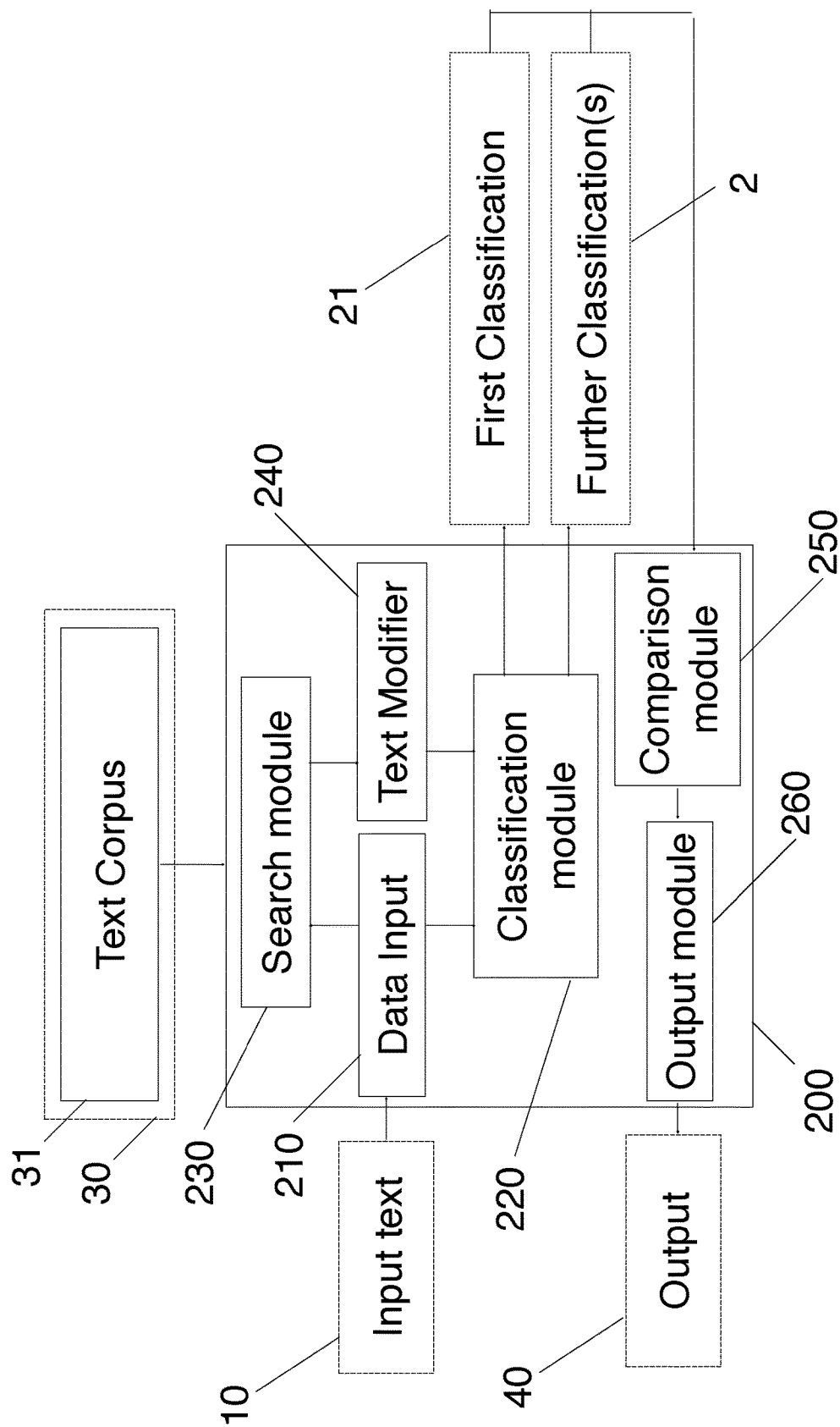
FIG. 2 is a schematic diagram showing a processing apparatus according to an embodiment.

FIG. 2 of the accompanying drawings shows a schematic diagram of an embodiment of a processing apparatus 200 according to the present invention. The processing apparatus 200 comprises a data input 210, a classification module 220, a search module 230, a text modifier 240, a comparison module 250 and an output module 260. The processing apparatus 200 is configured to classify an input text document 10. The processing apparatus 200 is configured to execute a text classification model to classify the input text document 10.

The processing apparatus 200 comprises one or more processors. Each of the modules of the processing apparatus 200 may be implemented with one or more processors. Some or all of the modules may be combined onto a single processor. The processing apparatus 200 may include one or more internal memory units. Alternatively, or in addition, the processing apparatus 200 may be connected to a memory 30.

The memory 30 is configured to store instructions for the processing apparatus 200. The memory 30 may comprise, for example, one or more hard disc drives, solid state drives, or a combination as required. The memory 30 stores e.g. an algorithm, program, application, software etc. for execution by a processor, such as the data processing module 230. The instructions, when executed, may cause the processing apparatus 200 to execute a processing method, for example, to perform a method for classifying the input text document 10.

In some examples, the memory 30 is further configured to store operational data. Operational data may be stored persistently, for example, the memory 30 may record a final or intermediary output of the processing apparatus 200. In some examples, the memory 30 may store a text corpus 31 for the text classification model. The memory 30 may store a plurality of text corpuses, for instance, corresponding to data received at different points in time. In some examples, data may be stored transiently. The memory 30 may comprise one or more transient storage media e.g. flash memory. The memory 30 may store parameters or variables required for computation for a short time only.

The data input 210 is configured to receive an input text document 10. The input text 10 may be, for example, a text correspondence such as an email, letter or short message. The document may be a news article, scientific article, web-page, book, e-book or any other fiction or non-fiction piece of text. In some embodiments, the input text 10 may be an except from a larger piece of text. For example, in some embodiments, the input text 10 may be pre-processed to extract one or more relevant words, phrases, sentences or sections to improve the classification result. In some examples, the input text 10 may be received through a local connection, over a network connection or may be retrieved from a local storage. The data input 210 is configured to provide the input text 10 to the classification module 220.

The classification module is configured to generate a first classification 22 for the input text 10. The classification module is configured to use a text classification model to generate the first classification 22 for the input text 10. The text classification model may be a document classification model and may be configured to assign a plurality of text documents to a plurality of document classes. For example, a document classification model may receive a plurality of incoming emails and assign each incoming email to a class according to an intent of the author. In some embodiments, the text classification model includes additional processing to extract one or more relevant words, phrases, sentences or sections to improve the classification result.

The search module 230 is configured to search for one or more terms from the input text 10 within the text corpus 31 of the model. The text classification model is based on a model text corpus which comprises each word in each training document used to train the model. In some embodiments, the search module 230 may search within the model text corpus, or a different text corpus. For example, the search module 230 may search within a larger text corpus of which the model text corpus is a subset. In some embodiments, the model text corpus includes each word in one or more words, phrases, sentences or sections extracted from a plurality of documents in the larger text corpus to improve the classification result, and the search module 230 is configured to search the larger text corpus.

The search module 230 may be configured to search the text corpus using a pre-trained model. Alternatively, the search module 230 may be configured to fine-tune a pre-trained model using the text corpus 31 and search the text corpus using the fine-tuned model. Alternatively, the search module 230 may be configured to train a dedicated word embedding model using the text corpus 31 and search the text corpus 31 using the dedicated word embedding model.

In some embodiments the search module 230 may search for every term in the input text 10 within the text corpus 31. In some embodiments, the search module 230 may identify one or more significant terms which contribute to the first classification 21 of the input text 10, and search only for the identified significant terms within the text corpus 31. The significant terms may be based on an attention layer of the text classification model. In this way, the search module 230 can identify those terms which had the most significant impact on the outcome of the first classification 21. It can be expected that these terms are also more likely to be the cause of any misclassification by the model.

If one or more of the searched terms has an incidence in the text corpus lower than a threshold incidence, the search module 230 is configured to flag those terms. In this way, the search module 230 can identify terms which may be regarded as suspect in the classification process. Those terms which are not present in the text corpus 31, or have a low incidence, can be considered to be relatively unknown to the text classification model, and may therefore have an unexpected effect of the outcome of the text classification model. It can be expected that these terms are likely to be the cause of any misclassification by the model.

In some embodiments, in response to identifying a searched term having an incidence in the text corpus 31 lower than the threshold incidence, the search module 230 may generate one or more words that are similar to the identified low incidence term. The search module 230 may search for the one or more similar words in the text corpus 31 and flag the identified low incidence term if a combined incidence of the low incidence term and the one or more similar words is below the threshold incidence. The similar words may be synonyms and/or similarly categorised words. For example, if the word "winter" is identified as appearing only once in the corpus, the search module 230 may search for similar words such as "spring", "summer" and "fall".

In some embodiments, the search module 230 may search for and combine the incidences for a pre-defined number of most similar words. For example, the search module 230 may be configured to search for three additional words, and will therefore search for all four of the above seasons. If "spring" appears twice, "summer" appears once and "fall" appears 3 times, then the combined incidence of all four will be 7 times. If the threshold is 5, for example, then the word "winter" will not be a flagged term, even though it has a low incidence in the text corpus 31.

In some embodiments, the threshold incidence is zero, that is, the term is not present in the text corpus 31.

The text modifier 240 is configured to remove at least one flagged term from the document and generates at least one further classification 22. In this way, the processing apparatus 200 can test whether a result of the classification changes or 'flips' based on the identified term alone. If a single low incidence term is changing the result of the classification of the entire input text 10, it can indicate that the term is cause the model to behave incorrectly. It can indicate that one or both of the classification results is incorrect. In particular, it may indicate that the first classification 21, which includes the term, is not correct.

In some embodiments, the text modifier 240 may replace the removed term with an entity token corresponding to the removed term, before generating the further classification 22. For example, the word "winter" may be replaced with an entity token [season].

In some embodiments, the text modifier 240 may identify a word that is similar to a removed term with a higher incidence in the text corpus 31, and replace the removed term with the identified similar word before generating the further classification 22. For example, in the example above, the word "winter" may be replaced with the word "fall", which has a higher incidence.

The comparison module 250 is configured to compare the first classification 21 with the further classification 22. In some embodiments, the comparison module 250 may be configured to perform a plurality of further classifications. For example, if a plurality of terms have been flagged the text modifier 240 may be configured to remove each term from the document in turn and the comparison module 250 may be configured to perform a further classification for the document for the document with each term removed.

The output module 260 is configured to generate an output 40, if the further classification 22 is different from the first classification 21. As described above, the output of the comparison module 250 may indicate that one or both of the classification results is incorrect. In particular, it may indicate that the first classification 21, which includes the term, is not correct. In some embodiments, the output module 260 may output the further classification 22 as a classification result in the output 40, based on the reasoning that the identified term is causing the model to behave erroneously, and so the classification result based on the document without the identified term is more likely to be correct. Alternatively, or in addition, the output module 260 may be configured to generate output 40 comprising an indication for a user to manually check a classification result.

In some embodiments, the output module 260 may be configured to update the text corpus 31 to include the input text 10 with the flagged term removed. In some embodiments, the output module 260 may replace a removed term with an entity token corresponding to the removed term and update the text corpus 31 to include the input text 10 with the replaced term. In this way, the model can be improved over time by the addition of new documents to the text corpus 31, without introducing inaccuracies caused by those terms which cause spurious results in the classification. As described above, the documents may be added to the model text corpus, or may be added to a larger text corpus from which the model text corpus is derived.

Figure 3:
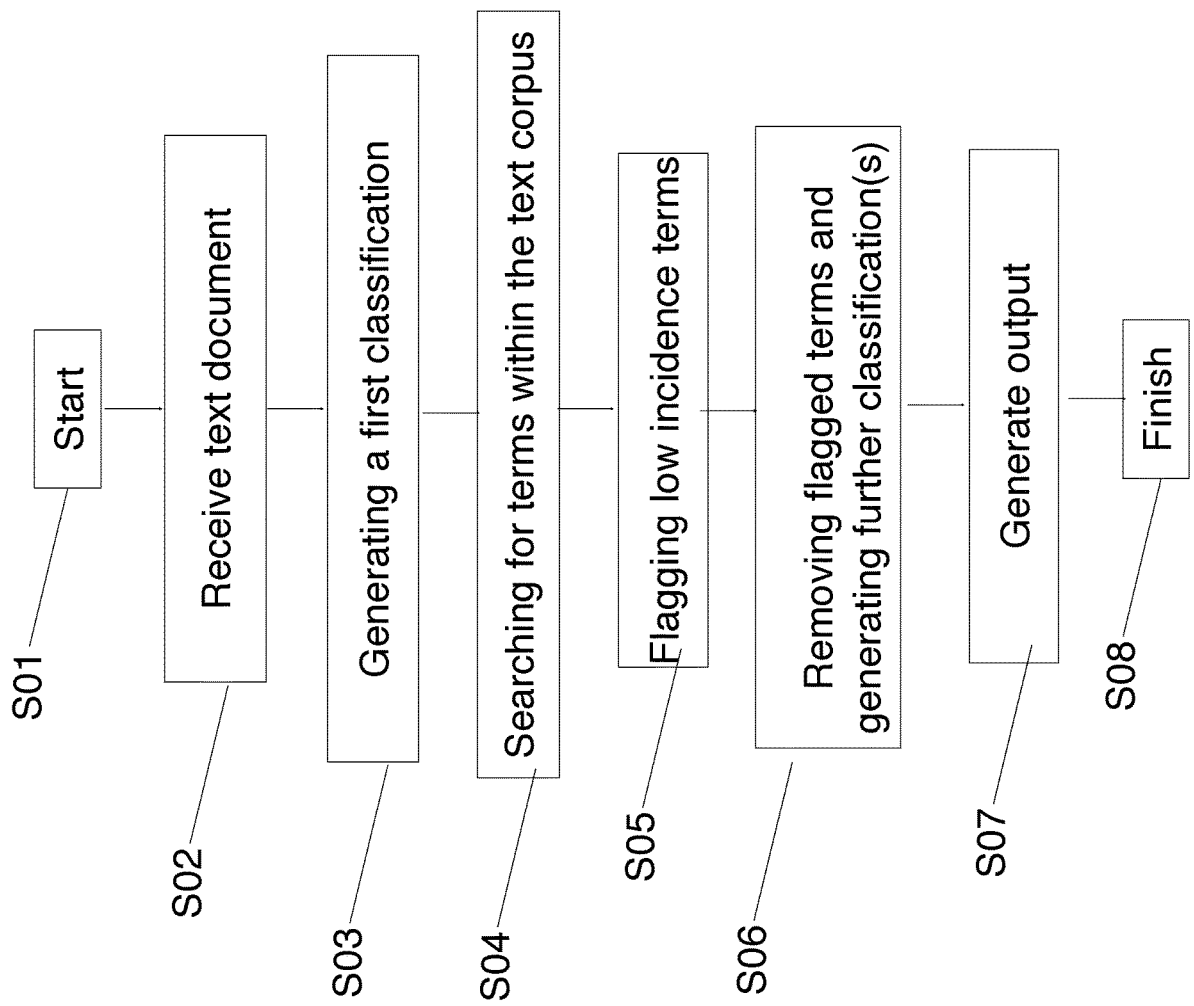
FIG. 3 is a flowchart showing a method according to an embodiment.

FIG. 3 of the accompanying drawings shows a flowchart representing a method of classification according to an embodiment. The method starts at step S01.

At step S02, a processor receives a text document. The document may be, for example, a text correspondence such as an email, letter or short message. The document may be a news article, scientific article, web-page, book, e-book or any other fiction or non-fiction piece of text. In some embodiments, the document may be an except from a larger piece of text. For example, in some embodiments, the document may be pre-processed to extract one or more relevant words, phrases, sentences or sections to improve the classification result.

At step S03, the processor uses a text classification model to generate a first classification for the document. The text classification model may be a document classification model and may be configured to assign a plurality of text documents to a plurality of document classes. For example, a document classification model may receive a plurality of incoming emails and assign each incoming email to a class according to an intent of the author. In some embodiments, the text classification model includes additional processing to extract one or more relevant words, phrases, sentences or sections to improve the classification result.

At step S04, the processor searches for one or more terms from the document within a text corpus. The text classification model is based on a model text corpus which comprises each word in each training document used to train the model. In some embodiments, the processor may search within the model text corpus, or a different text corpus. For example, the processor may search within a larger text corpus of which the model text corpus is a subset. In some embodiments, the model text corpus includes each word in one or more words, phrases, sentences or sections extracted from a plurality of documents in the larger text corpus to improve the classification result, and the processor is configured to search the larger text corpus.

The processor may be configured to search the text corpus using a pre-trained model. Alternatively, the processor may be configured to fine-tune a pre-trained model using the text corpus and search the text corpus using the fine-tuned model. Alternatively, the processor may be configured to train a dedicated word embedding model using the text corpus and search the text corpus using the dedicated word embedding model.

In some embodiments the processor may search for every term in the document within the text corpus. In some embodiments, the processor may identify one or more significant terms which contribute to the first classification of the document, and search only for the identified significant terms within the text corpus. The significant terms may be based on an attention layer of the text classification model. In this way, the processor can identify those terms which had the most significant impact on the outcome of the first classification. It can be expected that these terms are also more likely to be the cause of any misclassification by the model.

At step S05, if one or more of the searched terms has an incidence in the text corpus lower than a threshold incidence, the processor flags those terms. In this way, the processor identifies terms which may be regarded as suspect in the classification process. Those terms which are not present in the text corpus, or have a low incidence, can be considered to be relatively unknown to the text classification model, and may therefore have an unexpected effect of the outcome of the text classification model. It can be expected that these terms are likely to be the cause of any misclassification by the model.

In some embodiments, in response to identifying a searched term having an incidence in the text corpus lower than the threshold incidence, the processor may generate one or more words that are similar to the identified low incidence term. The processor may search for the one or more similar words in the text corpus and flag the identified low incidence term if a combined incidence of the low incidence term and the one or more similar words is below the threshold incidence. The similar words may be synonyms and/or similarly categorised words. For example, if the word "winter" is identified as appearing only once in the corpus, the processor may search for similar words such as "spring", "summer" and "fall".

In some embodiments, the processor may search for and combine the incidences for a predefined number of most similar words. For example, the processor may be configured to search for three additional words, and will therefore search for all four of the above seasons. If "spring" appears twice, "summer" appears once and "fall" appears 3 times, then the combined incidence of all four will be 7 times. If the threshold is 5, for example, then the word "winter" will not be a flagged term, even though it has a low incidence in the text corpus.

In some embodiments, the threshold incidence is zero, that is, the term is not present in the text corpus.

At step S06, the processor removes at least one flagged term from the document and generates at least one further classification. In this way, the processor can test whether a result of the classification changes or 'flips' based on the identified term alone. If a single term is changing the result of the classification of the entire document, it can indicate that the term is cause the model to behave incorrectly. It can indicate that one or both of the classification results is incorrect. In particular, it may indicate that the first classification, which includes the term, is not correct.

In some embodiments, the processor may replace removed term with an entity token corresponding to the removed term, before generating the further classification. For example, the word "winter" may be replaced with an entity token [season].

In some embodiments, the processor may identify a word that is similar to a removed term with a higher incidence in the text corpus, and replace the removed term with the identified similar word before generating the further classification. For example, in the example above, the word "winter" may be replaced with the word "fall", which has a higher incidence.

In some embodiments, the processor may be configured to perform a plurality of further classifications. For example, if a plurality of terms has been flagged the processor may be configured to remove each term from the document in turn and perform a further classification for the document for the document with each term removed.

At step S07, the processor generates an output, if the further classification is different from the first classification. As described above, the comparison may indicate that one or both of the classification results is incorrect. In particular, it may indicate that the first classification, which includes the term, is not correct. In some embodiments, the processor may output the further classification as a classification result, based on the reasoning that the identified term is causing the model to behave erroneously, and so the classification result based on the document without the identified term is more likely to be correct. Alternatively, or in addition, the processor may output an indication for a user to manually check a classification result.

In some embodiments, the processor may update the text corpus to include the text document with the flagged term removed. In some embodiments, the processor may replace a removed term with an entity token corresponding to the removed term and update the text corpus to include the text document with the replaced term. In this way, the model can be improved over time by the addition of new documents to the text corpus, without introducing inaccuracies caused by those terms which cause spurious results in the classification. As described above, the documents may be added to the model text corpus, or may be added to a larger text corpus from which the model text corpus is derived.

The method finishes step at S08.

Although aspects of the invention herein have been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the scope of the invention as defined by the appended claims.

The invention claimed is:

1. A computer implemented method of document classification, comprising:
receiving a text document;
generating, using a text classification model, a first classification for the document;
searching for one or more terms from the document within a text corpus, wherein the corpus comprises each word in each training document used to train the model;
flagging one or more of the searched terms having an incidence in the text corpus lower than a threshold incidence;
removing at least one flagged term from the document and generating at least one further classification; and
generating an output, if the further classification is different from the first classification.

2. The method of claim 1, wherein searching for one or more terms includes: identifying one or more significant terms which contribute to the first classification of the document, and searching for the identified significant terms within the text corpus.

3. The method of claim 2, wherein the significant terms are based on an attention layer of the text classification model.

4. The method of claim 1, wherein searching further includes, in response to identifying a searched term having an incidence in the text corpus lower than the threshold incidence:
generating one or more words that are similar to the identified low incidence term,
searching for the one or more similar words in the text corpus; and
flagging the identified low incidence term if a combined incidence of the low incidence term and the one or more similar words is below the threshold incidence.

5. The method of claim 1, wherein the threshold incidence is zero.

6. The method of claim 1, wherein generating the further classification comprises generating a plurality of further classifications for each a plurality of flagged terms.

7. The method of claim 1, wherein generating the further classification includes replacing a removed term with an entity token corresponding to the removed term.

8. The method of claim 1, wherein generating the further classification includes:
identifying a word that is similar to a removed term with a higher incidence in the text corpus, and
replacing the removed term with the identified similar word.

9. The method of claim 1, wherein the output includes outputting the further classification as a classification result.

10. The method of claim 1, wherein the output includes an indication for a user to manually check a classification result.

11. The method of claim 1, wherein the output includes updating the text corpus to include the text document with the flagged term removed.

12. The method of claim 1, wherein the output includes replacing a removed term with an entity token corresponding to the removed term and updating the text corpus to include the text document with the replaced term.

13. The method of claim 1, wherein the searching includes searching the text corpus using a pre-trained model, or fine-tuning a pre-trained model using the text corpus and searching the text corpus using the fine-tuned model, or training a dedicated word embedding model using the text corpus and searching the text corpus using the dedicated word embedding model.

14. A data processing apparatus comprising a processor configured to execute the method of claim 1.

15. A computer-readable medium configured to store instructions which, when executed by a processor, cause the processor to perform the method of claim 1.